United States Patent
De Lathauwer et al.

(10) Patent No.: US 10,344,839 B2
(45) Date of Patent: Jul. 9, 2019

(54) DEBLOCKING APPARATUS FOR A WORK MACHINE

(71) Applicant: CNH Industrial America LLC, New Holland, PA (US)

(72) Inventors: Tom A. De Lathauwer, Lede (BE); Jean-Pierre Vandendriessche, Erpe-Mere (BE)

(73) Assignee: CNH Industrial America LLC, New Holland, PA (US)

( * ) Notice: Subject to any disclaimer, the term of this patent is extended or adjusted under 35 U.S.C. 154(b) by 50 days.

(21) Appl. No.: 15/630,525

(22) Filed: Jun. 22, 2017

(65) Prior Publication Data

US 2017/0370452 A1 Dec. 28, 2017

(30) Foreign Application Priority Data

Jun. 22, 2016 (BE) .................................. 2016/5460

(51) Int. Cl.
*A01D 69/00* (2006.01)
*F16H 21/44* (2006.01)
*A01D 61/00* (2006.01)
*A01F 12/56* (2006.01)

(52) U.S. Cl.
CPC .......... *F16H 21/44* (2013.01); *A01D 61/008* (2013.01); *A01D 69/00* (2013.01); *A01F 12/56* (2013.01)

(58) Field of Classification Search
CPC .... A01D 61/008; A01D 69/00; A01D 75/172; A01D 90/14; A01F 12/56; A01F 15/10; A01F 15/0841; A01F 15/085; A01F 15/106; F16H 21/49; F16H 21/44

USPC .......................... 56/11.2, 341; 460/103, 116
See application file for complete search history.

(56) References Cited

U.S. PATENT DOCUMENTS

| 3,578,129 A | * | 5/1971 | Kato | ........................ B41J 19/20 |
| | | | | 400/280 |
| 3,608,557 A | | 9/1971 | Evans | |
| 5,626,062 A | * | 5/1997 | Colvin | .................... B25B 13/06 |
| | | | | 81/177.85 |

(Continued)

FOREIGN PATENT DOCUMENTS

| DE | 2452035 A1 | 9/1976 |
| EP | 0139264 A1 | 5/1985 |

(Continued)

*Primary Examiner* — Robert E Pezzuto
(74) *Attorney, Agent, or Firm* — Patrick M. Sheldrake; Peter K. Zacharias (57) ABSTRACT

An apparatus for actuating a rocking motion of a movable component including an adjustable length actuator, a lever whose angular position is controlled by the actuator, and a force transfer element attached to the movable component. The lever comprises a pair of oppositely placed pawls shaped so as to interact with the force transfer element for respectively actuating movement of the component in one of two opposite directions, when the lever exits a neutral positional range in which range any interaction between both pawls and the force transfer element is prohibited. The neutral range may be defined by a support plate positioned, shaped, and dimensioned so as to prohibit interaction between the pawls and the force transfer element. The displacement of the component in one direction may be larger than in the opposite direction.

14 Claims, 5 Drawing Sheets

(56) References Cited

U.S. PATENT DOCUMENTS

| | | | | |
|---|---|---|---|---|
| 6,644,006 B1 * | 11/2003 | Merritt | .................. | A01D 69/00 |
| | | | | 56/11.2 |
| 6,681,552 B2 * | 1/2004 | Nelson | .................. | A01F 15/085 |
| | | | | 56/11.2 |
| 7,669,400 B2 * | 3/2010 | Naaktgeboren | ........ | A01D 69/00 |
| | | | | 254/213 |
| 9,750,194 B2 * | 9/2017 | Vandamme | ......... | A01F 15/0841 |

FOREIGN PATENT DOCUMENTS

| | | | |
|---|---|---|---|
| EP | 1854343 | A1 | 11/2007 |
| FR | 2738709 | A1 | 3/1997 |

\* cited by examiner

DEBLOCKING APPARATUS FOR A WORK MACHINE

CROSS REFERENCE TO RELATED APPLICATION

This application claims priority to Belgium Application No. 2016/5460 filed Jun. 22, 2016, the contents of which are incorporated herein by reference.

FIELD OF THE INVENTION

The present invention is related to an auxiliary apparatus applicable in a work machine, primarily an agricultural machine, in particular to an apparatus for deblocking a movable component, such as a feed roller in a combine harvester.

BACKGROUND OF THE INVENTION

Agricultural combine harvesters are machines designed for harvesting and processing crops such as wheat or corn. Crops are cut from the field on a wide area by the header mounted at the front of the combine. The harvested material is transported by a feeder to a pair of laterally or longitudinally mounted threshing rotors.

In Twin Rotor® type combine harvesters produced by the applicant, a Dynamic Feed Roll™ is mounted between the feeder and the longitudinally placed pair of threshing rotors. The DFR feeds the crops through to the threshing rotors while removing larger objects such as stones or wooden blocks. The DFR is an example of a rotating component liable to become blocked when large stones or swathes of densely packed crop material are transported through the feeder. Deblocking the DFR requires manual manipulation of the roll, for example rocking the roll back and forth a number of times. This manual intervention is cumbersome and time-consuming.

Other agricultural machines such as balers or forage harvesters are often also equipped with similar feed rolls which are susceptible to blocking and generally suffering from the same drawbacks as described above. Similar problems may occur in any type of work machine comprising rotating or otherwise moving components.

Systems have been devised for deblocking a rotating component with the help of a hydraulic actuator and a ratchet mechanism. An example of such a system applied in an agricultural baler is shown in document EP-A-1847170. However these mechanisms do not allow to reproduce the required back-and-forth rocking movement needed for effective deblocking.

SUMMARY OF THE INVENTION

The present invention is related to a deblocking apparatus for a movable component, as disclosed in the appended claims. The invention concerns an apparatus for actuating a rocking motion of a movable component, the apparatus comprising an actuator, preferably an adjustable length actuator, a lever whose angular position is controlled by the actuator and a force transfer element attached to the movable component, and wherein the lever is provided with a pair of oppositely placed pawls, the pawls being shaped so as to engage with the force transfer element for respectively actuating movement of the component in one of two opposite directions, when the lever exits a neutral positional range in which range any interaction between both pawls and the force transfer element is prohibited. The neutral range may be defined by a support plate positioned, shaped and dimensioned so as to prohibit any interaction between the pawls and the force transfer element (i.e. neither engaging with the force transfer element nor coming in contact with said element without exerting a force on the element). The force transfer element is attached to the movable component in the sense that the force transfer element and the movable component form an assembly that moves as a single body. The force transfer element may be integral to the movable component.

Each pawl is configured to actuate motion of the force transfer element and thereby the movable component in one direction only, while in the opposite direction the pawl is incapable of exerting a force on the force transfer element. This may be achieved by providing pawls that are pivotable with respect to the lever. The force transfer element is preferably a component provided with gears or similar proliferations that allow interaction with the pawls. The apparatus of the invention is particularly advantageous in that it is capable of actuating a rocking motion wherein the forward motion has a different range than the backward motion. This is useful in many applications, for example for deblocking a dynamic feed roll in a combine harvester.

DETAILED DESCRIPTION OF PREFERRED EMBODIMENTS OF THE INVENTION

Preferred embodiments will now be described with reference to the drawings. The detailed description is not limiting the scope of the invention, which is defined only by the appended claims. When used in relation to the apparatus mounted in a combine harvester, the terms 'front', 'forward', 'backward,' 'back', 'rear' are referenced with respect to the direction in which crops move through the combine, i.e. from the front to the back. In the present context, a pawl is defined as a tool that is shaped to engage with a force transfer element such as a gear ring or a ratchet wheel. Still according to the present context, a pawl is attached to or part of a larger structure, and can be pivotable with respect to said structure or not.

Figure 1:
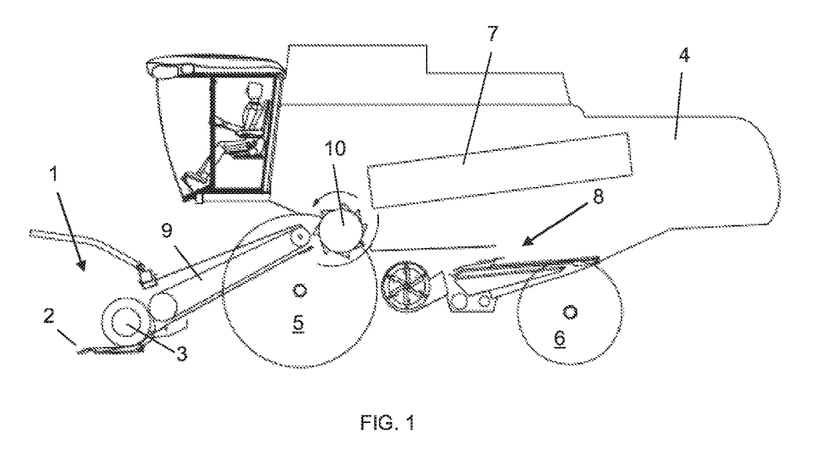
FIG. 1 is a schematic side view of a combine harvester, indicating the position of the dynamic feed roll between the feeder and the threshing rotors.

FIG. 1 shows a side view of a combine harvester, comprising a header 1 mounted at the front of the combine. The header comprises knives 2 maintained at a given height above ground level while the combine moves through a field of crops that are to be harvested. Cut crops are transported from both lateral sides of the header towards a central area by an auger 3. The main body 4 of the combine is supported by front and rear wheels 5 and 6 and comprises a pair of longitudinally mounted threshing rotors 7 and a cleaning section 8 generally known by the skilled reader and not described here in detail. From the central area of the header 1, crops are transported by a feeder 9. A dynamic feed roll 10 is mounted between the feeder 9 and the threshing rotors 7. Hereafter the dynamic feed roll will be referred to by its abbreviation DFR. The direction of rotation of the DFR when the combine is in normal operation is indicated by an arrow. Embodiments of the invention will be described with respect to the deblocking of a DFR, even though it is pointed out that the invention is not limited to this application.

Figure 2:
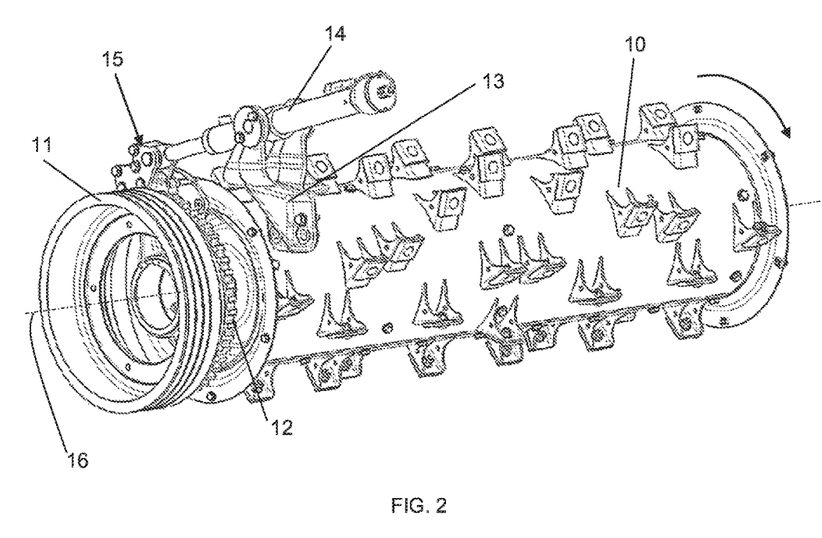
FIG. 2 shows an apparatus according to one embodiment of the invention, and its implementation with respect to a dynamic feed roll in a combine harvester.

FIG. 2 illustrates how an apparatus according to a preferred embodiment of the invention is mounted on the combine for deblocking the DFR 10. During normal operation, the DFR is operated through a drive pulley 11 attached to the DFR and rotating about the DFR's rotation axis 16 in the direction of the arrow. A gear ring 12 is attached to the drive pulley 11, for example bolted to the side of the pulley, i.e. the gear ring 12 is attached to the DFR 10 itself and forms a single body with the DFR. A bracket 13 is mounted on a stable structure (not shown), preferably on a side wall of the combine or on the structure supporting the DFR, referred to hereafter as the DFR frame. The cylinder of a hydraulic adjustable length actuator 14 is rotatably mounted on the bracket 13. The extendable arm of the actuator is rotatably connected at its distal end to a lever 15.

Figure 3A:
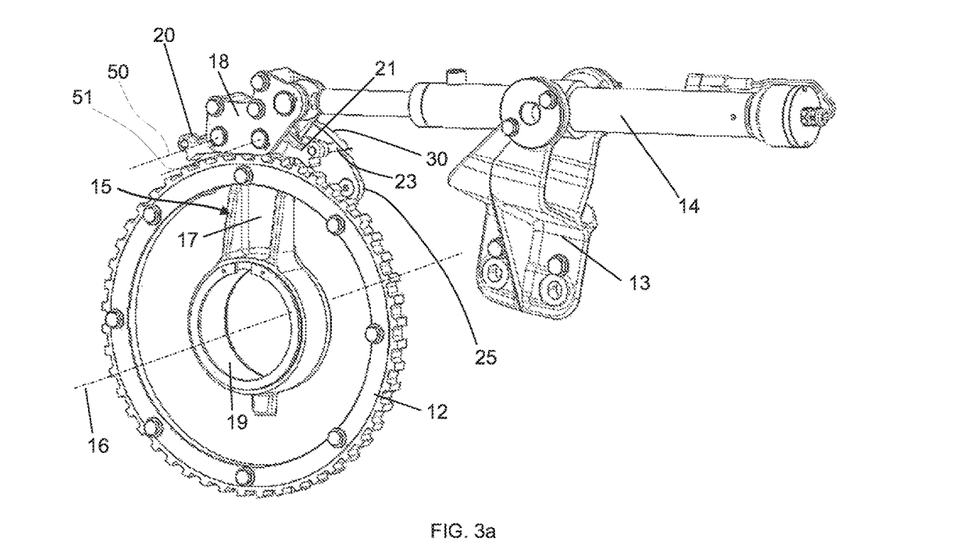
FIGS. 3a and 3b show two views of the apparatus according the embodiment of FIG. 2.
Figure 3B:
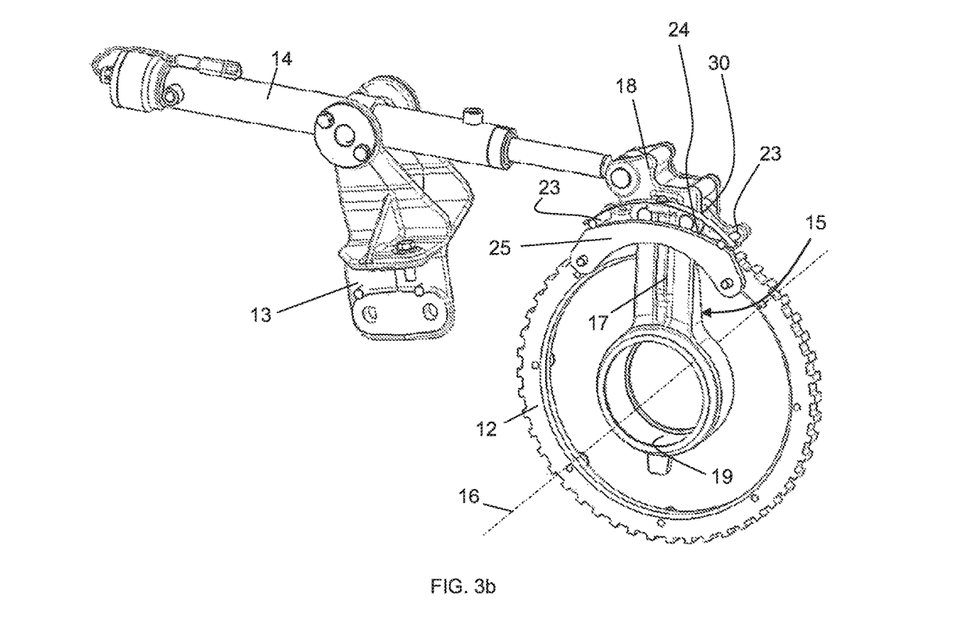

FIGS. 3*a* and 3*b* show the apparatus from two different angles. The lever 15 is rotatable about the rotation axis 16 of the DFR, and comprises a lever arm 17 extending in a radial direction with respect to the rotation axis 16 and a lever head 18 mounted at the distal end of the lever arm 17. At its proximal end, the lever arm 17 is rotatable about a central axle (not shown), via a bushing 19. The rotatable connection of the actuator 14 with the bracket 13 and the rotatable connection of the extendable arm of the actuator with the lever head 18 enables the actuation of an angular displacement of the lever through a given angular range defined by the dimensions and positioning of the components.

The apparatus of the invention is operated when the normal rotation of the DFR 10 is interrupted due to a blockage. By extending and retracting the movable arm of the adjustable length actuator 14, the apparatus actuates a forwards and backwards rocking motion of the DFR 10 to thereby remove the obstructing objects. The angular displacement of the DFR in one direction is preferably different from the angular displacement in the opposite direction. In the specific case of the DFR shown in the drawings, the angular displacement in the reverse direction, i.e. opposite the normal rotation direction, takes place over a larger angle than in the forward direction, so that obstructing objects are removed towards the front of the DFR where they can be easily evacuated.

Further details of how this is achieved are shown in FIGS. 3*a* and 3*b*. Two pivotable pawls 20/21 are mounted on the lever head 18, extending outward from the lever head in opposite directions. The pawls are pivotably connected to the lever head 18 at their proximal end, being rotatable with respect to the lever head 18 about rotation axes 50/51 which are preferably parallel to the DFR's rotation axis 16. Each pawl is shaped at its distal end so as to fit into the spaces between the gears of the gear ring 12, in a manner to be able to subject the DFR to an angular displacement into one of the two opposite rotation directions, said angular displacement being actuated by the hydraulic actuator 14. In other words, one pawl is configured to push the DFR in one direction when the actuator is extended and the other pawl is configured to push the DFR in the opposite direction when the actuator is retracted. Each pawl is capable of exerting a force on the gear ring in one direction only. When moving in the opposite direction, the pawl skips over the gears. So when one pawl is actuating a rotation of the DFR, the other is not and vice versa. Based on this, reference is made hereafter to the 'actuating' and the 'non-actuating' pawl.

A support plate 25 is furthermore provided. The plate is stationary with respect to the lever 15 and may for example be mounted on the DFR frame. The support plate 25 is mounted adjacent to the gear ring 12, preferably parallel to the gear ring, and has an upper rim portion 24 preferably having a curved shape, more preferably the shape of a circular arc more or less parallel to the arc of the gear ring 12. As seen in the drawings, the pawls 20/21 are equipped with rods 23 extending laterally outward from the pawls and beyond the position of the support plate 25. A non-actuating pawl that approaches the plate is lifted up by the plate, i.e. the support plate 25 lifts the rod 23 and thereby the pawl 20/21 up, pivoting the pawl away from the gear ring 12 and thereby prohibiting any interaction between this pawl and the gear ring as long as the pawl remains supported by the plate 25. The apparatus is preferably configured so that across the entire range of the lever's angular displacement, at least one of the pawls is supported by the plate 25 and thereby prohibited from interacting with the gear ring 12. In an alternative embodiment, the pawls are not equipped with rods 23 and the support plate is configured to support the rotating pawls directly. In this case the plate may have the shape of a cylindrical shell mounted between the gear ring 12 and the pawls 20/21 so that the non-actuating pawls are pivoted upwards and away from interacting with the gear ring 12 when they reach the plate.

In a subrange of the angular displacement range, referred to hereafter as the neutral positional range or neutral range, both pawls 20/21 are supported by the support plate 25, i.e. neither of the pawls is capable of interacting with the gear ring 12. When the DFR is in normal operation, i.e. rotated via the drive pulley 11, the lever 15 is positioned within the neutral range. Both pawls 20 and 21 are supported by the plate 25 and thereby incapable of interacting with the gear ring 12. When a blockage occurs, the DFR can be rocked back and forth by operating the actuator 14. Extending the movable arm of the actuator 14 causes the first pawl 20 to interact with the gear ring 12 and thereby actuate a reverse rotation of the DFR as soon as this pawl moves beyond the support plate 25. Meanwhile the second pawl 21 remains supported by the plate 25 and is thereby prohibited from interacting with the gear ring 12. When the actuator 14 is retracted, the first pawl 20 skips across the teeth of the gear ring until it reaches the support plate 25. A further retraction moves both pawls through the neutral range where they are both supported by the plate 25. Then the second pawl 21 reaches the end of the plate 25 and interacts with the gear ring 12, pushing the ring and the thereby the DFR through an angular displacement in the opposite direction, i.e. in the forward direction of the DFR. By repeating the extension and retraction of the actuator 14 a number of times, a rocking motion is generated, suitable for deblocking the DFR. By a suitable design of the dimensions and positions of the various components, for example the position of the actuator 14 and its rotation axis about the bracket 13 and/or the dimensions of the support plate 25, it is possible to obtain an angular displacement in the reverse direction that is higher than the angular displacement in the forward direction.

In the embodiment shown, a leaf spring 30 is added to the design. The spring is connected to the lever head 18 and configured to push the pawls 20/21 down onto the support plate 25 or onto the gear ring 12. Moving the pawls away from the plate or the gear ring takes place against the spring bias. The spring 30 thereby ensures that the pawls remain in contact with the either the plate 25 or the gear ring 12.

Figure 4A:
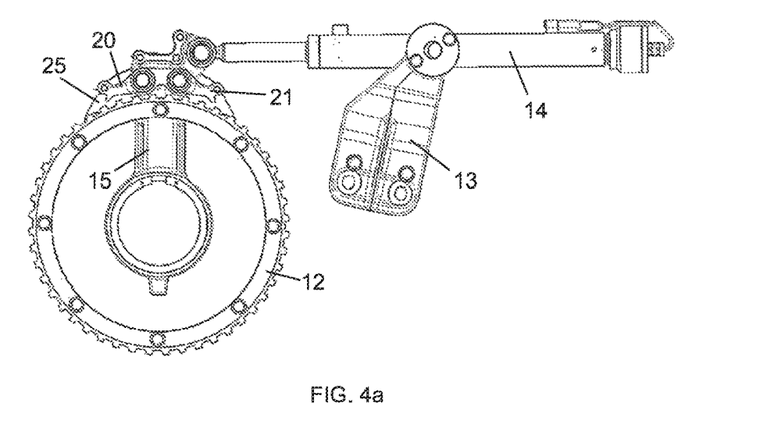
FIGS. 4a to 4c show a side view of the apparatus of FIGS. 2 and 3, respectively in a neutral position and in the two extreme positions.
Figure 4B:
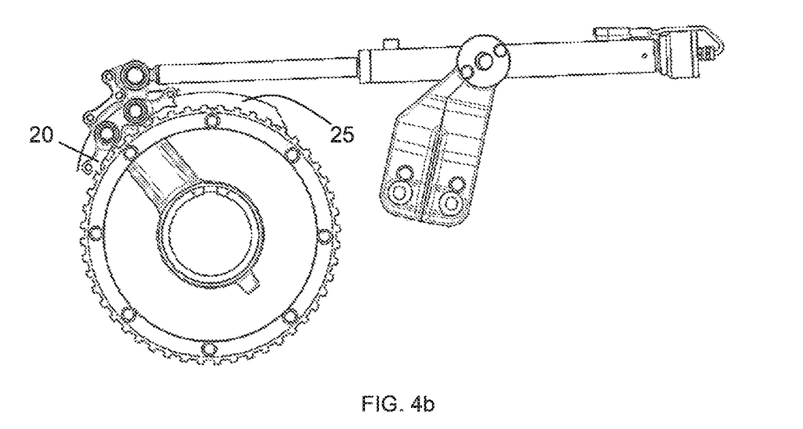
Figure 4C:
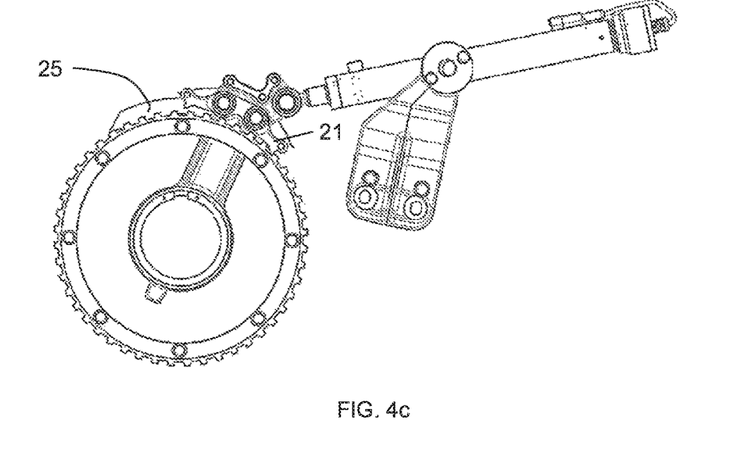

FIGS. 4a to 4c show side views of the apparatus in three angular positions of the lever 15. FIG. 4a is a view of a position within the neutral range. The pawls 20/21 are supported by the plate 25 and thereby prohibited from engaging with the gear ring 12. FIG. 4b shows the position wherein the actuator 14 is extended to its full length. The left pawl 20 has engaged with the gear ring and has pushed the lever 15 to its extreme angular position in the reverse direction of the DFR. Meanwhile the right pawl 21 has remained in contact with the plate 25 and thus away from interaction with the gear ring 12. FIG. 4c shows the position wherein the actuator 14 is fully retracted. The right pawl 21 has pushed the lever to its opposite extreme position in the forward rotation direction of the DFR, while the left pawl 20 has been brought back to a position where it is lifted away from the gear ring by the plate 25. It is visible in these drawings that the angular position of the lever in FIG. 4b is larger than in FIG. 4c, i.e. the rocking motion of the DFR in its reverse direction is larger than in its forward direction.

The apparatus preferably comprises a sensor (not shown) for determining when the lever 15 has reached the neutral range. The sensor may be placed on the hydraulic actuator 14 and may be any known sensor type applied for this purpose. Alternatively, the sensor may be placed on the lever 15 or the support plate 25 and may be any suitable sensor type applicable for determining the position of a moving component. Alternatively or in addition to a sensor, the apparatus can be equipped with a return spring configured to move the lever 15 into the neutral range when the actuator 14 is in the pressureless condition. A third possibility is the use of a hydraulic actuator equipped with a 3-position cylinder that forces the actuator into a central position when both sides are pressurized. Instead of a hydraulic actuator, other types of adjustable length actuators may be used, such as a pneumatic actuator or a crank mechanism.

Figure 5:
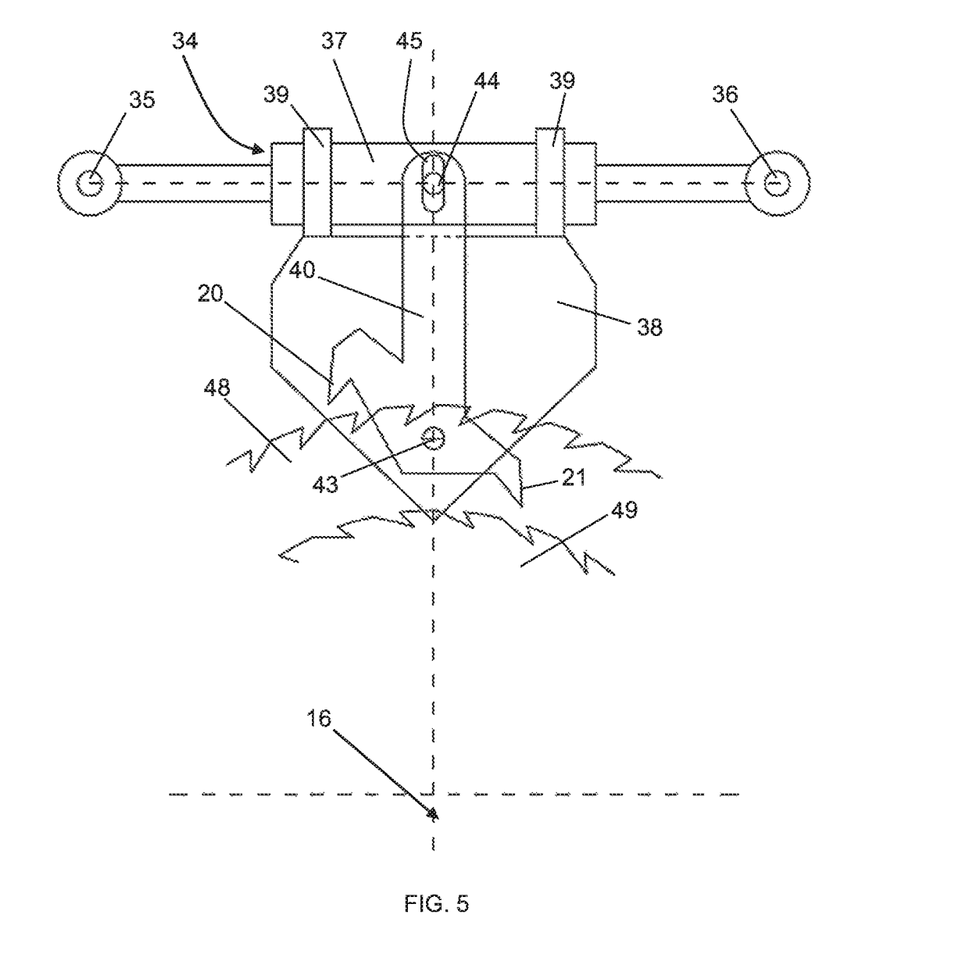
FIG. 5 shows an alternative embodiment of an apparatus according to the invention.

Another embodiment of an apparatus according to the invention is shown in FIG. 5. A variable length hydraulic actuator 34 is mounted between two fixed points 35/36, so that the cylinder 37 of the actuator is movable between the points. A plate 38 is connected to the cylinder by a pair of gliding elements 39, so that the cylinder 37 is linearly movable with respect to the plate 38 and vice versa. A lever 40 is connected at its distal end to the plate 38 through a pivot connection 43, i.e. the lever is rotatable with respect to the plate 38. At its proximal end, the lever 40 is further connected to the cylinder 37 by an axle 44 mounted in an elongated opening 45 of the lever, thereby permitting rotation of the lever 40 with respect to the cylinder 37 while also permitting a translation within the confines of the elongated opening 45. At its distal end, the lever 40 comprises two pawls 20/21 on opposite sides. The pawls are configured to interact with respective ratchet wheels 48/49, which are both attached to the DFR (not shown), i.e. both ratchet wheels form a uniform set of force transfer elements which rotate together with the DFR about its rotation axis 16. The position shown in FIG. 5 is a neutral position, i.e. neither of the pawls interacts with the ratchet wheels. A movement of the cylinder 37 to the left from the shown neutral position initially causes rotation of the lever 40 about the pivot 43 while the plate 38 remains stationary, i.e. the cylinder moves with respect to the stationary gliding elements 39. This continues until the left pawl 20 engages with the larger 48 of the ratchet wheels. Continued movement to the left of the cylinder 37 now causes simultaneous movement of the plate 38 and the cylinder 37, while the lever 40 continues to rotate with respect to the plate 38, so that rotation of the larger ratchet wheel 48 to the left is actuated. When the cylinder 37 reaches a limit position, movement to the right is initiated. The left pawl 20 is released from the larger ratchet wheel 48. The cylinder 37 and the plate 38 move back towards the central position. When moving past the central position, at some point the right pawl 21 engages with the smaller ratchet wheel 49, and continued movement of the cylinder 37 actuates a rotation of the smaller ratchet wheel 49 in the opposite direction. Judicial dimensioning of the diameters of the ratchet wheels 48/49 and other dimensions and positions of components allows to obtain a rotation in one direction that is larger than the rotation in the opposite direction. In this way, a rocking movement is actuated that is suitable for deblocking the DFR.

In the embodiment of FIG. 5, the neutral positional range of the lever is not determined by a support plate and the pawls are not pivotable with respect to the lever. The neutral range is determined by the dimensions of the components, for example the exact shape and size of the pawls. FIG. 5 is a schematic drawing and not a technical drawing of a practical system. The skilled person understands however the principle of this embodiment and is able to reduce this embodiment to practice in a suitable manner. For example the pawls 20/21 are not moving in the same plane parallel to the drawing but must be fabricated to operate in respective parallel planes in which the ratchet wheels 48/49 are positioned.

Elements from the previously described embodiments may furthermore be combined as will also be apparent to the skilled reader. For example, the apparatus of FIGS. 2 to 4 may be equipped with a uniform set of two ratchet wheels actuated by pawls that may or may not be rotatable with respect to the lever. Or the embodiment of FIG. 5 may be equipped with a single gear ring, with pawls that are pivotable with respect to the lever and with a support plate for defining the neutral positional range in the manner shown in FIGS. 3 and 4.

Figure 6:
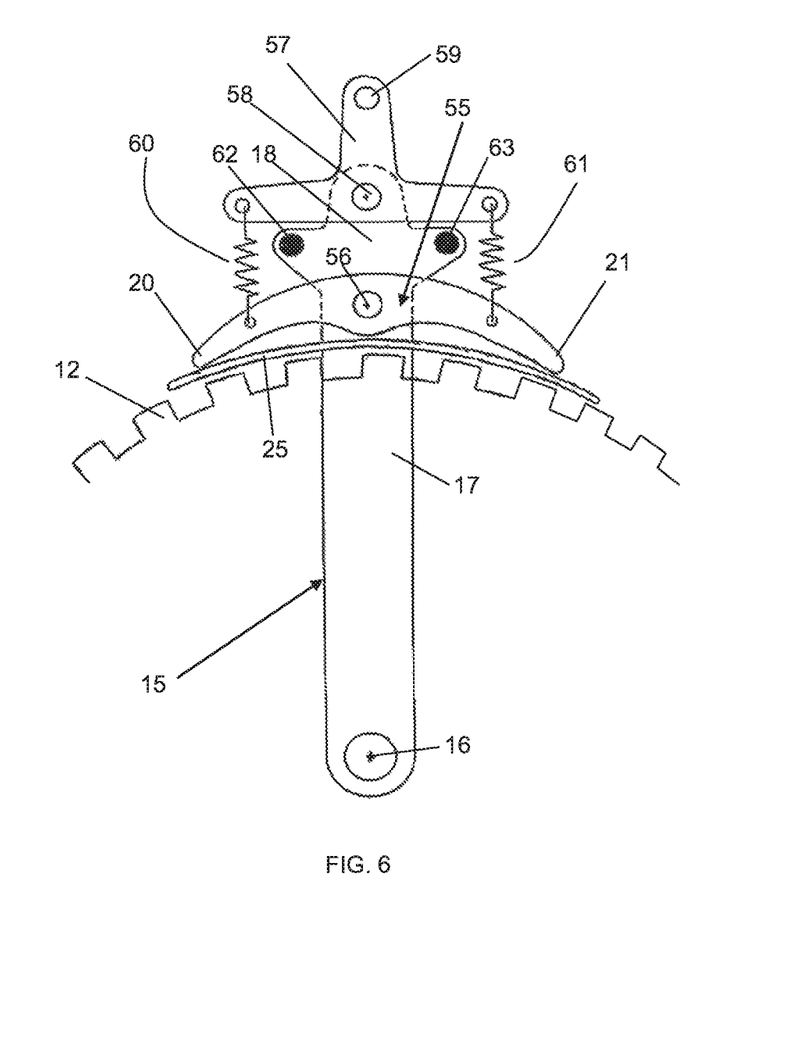
FIG. 6 shows another alternative embodiment of an apparatus according to the invention.

Another embodiment is shown in FIG. 6. In this embodiment, the two pawls 20/21 are the opposite outer ends of a single symmetric piece 55 that is pivotable with respect to a lever 15, about a central axis 56. So this is equally an embodiment wherein the pawls are pivotable with respect to the lever. The lever 15 has a lever arm 17 and a lever head 18 and rotates about the DFR's rotation axis 16, as in the first embodiment. A inverted T-shaped piece 57 is pivotably connected to the lever head 18, being pivotable about an axis 58 that is preferably parallel to the DFR's rotation axis 16. Viewed from the DFR's rotation axis 16, the T-shaped piece 57 is placed radially outward with respect to the symmetric piece 55. The end of a adjustable length actuator (not shown) is rotatably attached to the end 59 of the vertical leg of the T-shaped piece. The actuator may be a hydraulic actuator, like the one used in the first embodiment. The horizontal ends of the T-shaped piece 57 are connected to the symmetric piece 55 by a pair of linear springs 60/61. Lateral stops 62/63 are mounted on the lever head 18, which limit the rotation of the T-shaped piece with respect to said lever head. The pawls 20/21 are configured to engage with a gear ring 12 attached to the DFR as in the first embodiment. A plate 25 is mounted in between the pawls and the gear ring for defining a neutral positional range of the lever 15 by prohibiting the pawls from interacting with the gear ring. The actuator is positioned so that the extension of the actuator will cause motion towards the left-hand side from the position shown in FIG. 6, and retraction of the actuator will cause motion towards the right-hand side.

When the actuator is extended with respect to the position shown in FIG. 6, the initial movement is the tilting of the T-shaped piece 57 to the left, with respect to the stationary lever 15. The pivotable connection of the T-shaped piece 57 to the lever 15 must be designed so that the rotation of this piece encounters friction forces that are considerably inferior to the friction of the lever 15 in its rotation about the DFR's axis 16. Suitable design of said pivotable connection of the T-shaped piece 57 to the lever 15, for example by applying a roller bearing or other type of low-friction bearing, is possible in order to obtain the desired difference in friction. The difference must be sufficient to ensure that the T-shaped piece 57 is pivotable in both directions without generating a rotation of the lever 15.

In the position shown in FIG. 6, the springs 60/61 are preferably both extended, i.e. both springs exert a force that pulls the respective ends of the T-piece 57 towards the symmetric piece 55 and vice versa. When the T-piece 57 is tilted to the left under the force applied by the actuator, the left-hand spring 60 is compressed with respect to its initial state and the right hand spring 61 is extended further. The tilt of the T-piece 57 continues until it is stopped by the stop 62, at which point the lever 15 and the T-piece 57 start rotating as a single body about the FDR's axis 16. As long as the left pawl 20 remains in contact with the plate 25, no relative movement of the symmetric piece 55 with respect to the lever 15 is possible. At some point, the left pawl 20 reaches the end of the plate 25. As the symmetric piece 55 is no longer restrained by the plate 25, the spring forces are now allowed to act upon the symmetric piece 55. The higher spring force on the right hand side pivots the symmetric piece 55 upwards at this right hand side, and thus downwards on the opposite side, thereby pushing the left pawl 20 towards the gear ring 12, so as to engage with the teeth of the ring. Further extension of the actuator thus actuates the rotation of the gear ring 12 and thereby of the DFR to the left. When the actuator is retracted after reaching the extreme left-hand side position, the left pawl 20 reaches the edge of the plate 25 and is thereby forced away from the gear ring 12. Both pawls are again prohibited from interacting with the gear ring 12. The T-piece 57 rotates away from the stop 62 and is subsequently tilted towards the opposite stop 63 at which point actuation of the opposite rotation can begin. As in the previous embodiments, the shape and size of the symmetric piece 55 and the pawls 20/21, the T-piece 57 and the lever 15 can be designed so that the angular displacement of the lever 15 in one direction is different than in the other direction. The springs 60/61 are designed to comply with the above-described operation. The apparatus of the invention is not limited to the above-described application to a dynamic feed roll, but can be applied to any rotating component of a work machine that is required to be subjected to a rocking motion. The apparatus of the invention may for example be applied to the rotor of a baler, used to propel straw into the baling chamber. The invention is not limited to an apparatus for actuating a rocking motion of a rotating component. Embodiments of the apparatus can be applied for actuating a rocking motion of a linearly movable component for example, by providing a geared rail instead of a gear ring 12. Instead of the ratchet wheels 48/49 in the embodiment of FIG. 5, a pair of linear ratchets could be provided.

The invention claimed is:

1. An apparatus for actuating a rocking motion, the apparatus comprising:
   an actuator comprising a movable component;
   a lever configured to be subjected by the actuator to an angular displacement in two opposite directions with respect to a neutral positional range;
   a force transfer element attached to the movable component, wherein the lever is provided with first and second oppositely placed pawls shaped so as to engage with the force transfer element so that:
      both the first and second pawls are prohibited from engaging with the force transfer element when the lever is within the neutral positional range;
      the force transfer element and the movable component are displaced in a first direction of the two opposite directions by the first pawl engaging with the force transfer element, when the lever exits the neutral positional range in the first direction; and
      the force transfer element and the movable component are displaced in a second of the two opposite directions by the second pawl engaging with the force transfer element, when the lever exits the neutral positional range in the second direction;
      wherein a range of the displacement of the movable component in the first direction is different from a range of the displacement of the movable component in the second direction.

2. The apparatus according to claim 1, wherein the angular displacement of the lever takes place about an axis that is stationary with respect to the lever.

3. The apparatus according to claim 1, wherein the actuator comprises a movable part configured to effectuate a linear motion between two stationary points, and wherein the angular displacement of the lever takes place with respect to a plate connected to the movable part of the actuator while said plate is linearly movable with respect to the movable part of the actuator, and wherein the first and second pawls are attached to the lever at a distal end while the lever is connected at a proximal end to the movable part of the actuator in a manner so as to be able to pivot as well as undergo a translation with respect to a point of the movable part.

4. The apparatus according to claim 1, wherein the force transfer element comprises a single part provided with gear teeth, and wherein one of the first and second pawls is configured to engage with gear teeth for moving the movable component in one direction, and another of the first and second pawls is configured to engage with the gear teeth for moving the movable component in the opposite direction.

5. The apparatus according to claim 1, wherein the force transfer element comprises a uniform set of two ratchets, and wherein one of the first and second pawls is configured to engage with one ratchet of the two ratchets for moving the movable component in one direction, and the other of the first and second pawls is configured to engage with the other of the two ratchets for moving the movable component in an opposite direction.

6. The apparatus according to claim 1, further comprising a sensor for determining whether the lever is within the neutral positional range.

7. The apparatus according to claim 1, wherein the movable component of the actuator is a rotatable component, and wherein the displacement of the movable component is an angular displacement.

8. The apparatus according to claim 7, wherein a rocking motion of the rotatable component is actuated with motion in a reverse rotation direction of the rotatable component being larger than the motion in the forward direction.

9. An apparatus for actuating a rocking motion, the apparatus comprising:
an actuator comprising a movable component;
a lever configured to be subjected by the actuator to an angular displacement in two opposite directions with respect to a neutral positional range;
a force transfer element attached to the movable component, wherein the lever is provided with first and second oppositely placed pawls shaped so as to engage with the force transfer element so that:
both the first and second pawls are prohibited from engaging with the force transfer element when the lever is within the neutral positional range;
the force transfer element and the movable component are displaced in a first direction of the two opposite directions by the first pawl engaging with the force transfer element, when the lever exits the neutral positional range in the first direction; and
the force transfer element and the movable component are displaced in a second of the two opposite directions by the second pawl engaging with the force transfer element, when the lever exits the neutral positional range in the second direction;
wherein the first and second pawls are pivotable with respect to the lever, and wherein the apparatus further comprises a support plate that is stationary with respect to the lever and configured so that when the first pawl is not actuating a motion of the force transfer element approaches the plate, the first pawl is forced by the plate to pivot away from the force transfer element so that any interaction between the first and second pawls and the force transfer element is prohibited.

10. The apparatus according to claim 9, wherein the first and second pawls have respective laterally extending rods, wherein the support plate is positioned adjacent to the force transfer element, wherein the support plate comprises a rim portion configured to force the laterally extending rods and the first and second pawls into a position wherein any interaction with the force transfer element is prohibited.

11. The apparatus according to claim 9, wherein the support plate is mounted between the force transfer element and the first and second pawls, so that when one of the first and second pawls that is not actuating a motion of the force transfer element approaches the plate, that pawl is forced away from the force transfer element by direct contact between that pawl and the plate.

12. The apparatus according to claim 9, wherein the first and second pawls are at opposite ends of a single piece that is pivotable with respect to the lever, and wherein an inverted T-shaped piece is pivotably connected to the lever, the T-shaped piece comprising a vertical leg and horizontal legs, the T-shaped piece being itself pivotably connected at an end of the vertical leg to the actuator, wherein the horizontal legs of the T-shaped piece are connected respectively to the opposite ends of the single piece via a pair of springs, and wherein rotation of the T-shaped piece with respect to the lever is limited by a pair of stops placed on the lever on either side of the T-shaped piece.

13. The apparatus according to claim 9, further comprising a spring attached to the lever for exerting a spring force onto the first and second pawls for maintaining contact between (1) the first and second pawls and (2) the plate or the force transfer element.

14. A combine harvester comprising:
a dynamic feed roll; and
an apparatus mounted on the dynamic feed roll for actuating a rocking motion, the apparatus comprising:
an actuator comprising a movable component;
a lever configured to be subjected by the actuator to an angular displacement in two opposite directions with respect to a neutral positional range;
a force transfer element attached to the movable component, wherein the lever is provided with oppositely placed first and second pawls which are shaped so as to engage with the force transfer element so that:
both pawls are prohibited from engaging with the force transfer element when the lever is within the neutral positional range;
the force transfer element and the movable component are displaced in a first direction of the two opposite directions by the first pawl engaging with the force transfer element, when the lever exits the neutral positional range in the first direction; and
the force transfer element and thereby the movable component is displaced into a second of the two opposite directions by the second pawl engaging with the force transfer element, when the lever exits the neutral positional range in the second direction.

* * * * *